US 8,949,865 B1

(12) United States Patent
Murugesan et al.

(10) Patent No.: US 8,949,865 B1
(45) Date of Patent: Feb. 3, 2015

(54) UNIFIED USAGE TRACKING MECHANISM FOR APPLICATION

(71) Applicants: Venkatesan Murugesan, Mountain View, CA (US); Michael Rea Willson, Sunnyvale, CA (US)

(72) Inventors: Venkatesan Murugesan, Mountain View, CA (US); Michael Rea Willson, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/853,921

(22) Filed: Mar. 29, 2013

(51) Int. Cl.
*G06F 9/54* (2006.01)
*H04L 29/06* (2006.01)

(52) U.S. Cl.
CPC .................................. *G06F 9/541* (2013.01)
USPC .......................................... 719/328; 709/246

(58) Field of Classification Search
None
See application file for complete search history.

(56) References Cited

U.S. PATENT DOCUMENTS

| | | | |
|---|---|---|---|
| 7,020,880 B2 * | 3/2006 | Mellen-Garnett et al. | 719/310 |
| 2002/0184408 A1 * | 12/2002 | Hannigan et al. | 709/328 |
| 2006/0031584 A1 * | 2/2006 | McKinley et al. | 709/246 |
| 2007/0083813 A1 * | 4/2007 | Lui et al. | 715/709 |
| 2009/0165021 A1 * | 6/2009 | Pinkston et al. | 719/314 |
| 2010/0280855 A1 * | 11/2010 | Gupta | 705/7 |

* cited by examiner

*Primary Examiner* — Andy Ho
*Assistant Examiner* — Abdou Seye
(74) *Attorney, Agent, or Firm* — Osha Liang LLP (57) ABSTRACT

In general, in one aspect, the invention relates to a system that includes a computer processor, a tracking engine executing on the computer processor, and a translation engine executing on the computer processor. The tracking engine is configured to retrieve a translation engine from a translation engine provider system, detect a user-generated action has occurred, and generate a pre-translated event for the user generated action using the translation engine application programming interfaces (APIs). The translation engine is configured to translate the pre-translation event to obtain a first translated event, prepare the first translated event for transmission to a first tracking system, and send the first translated event to the first tracking system.

11 Claims, 8 Drawing Sheets

UNIFIED USAGE TRACKING MECHANISM FOR APPLICATION

BACKGROUND

Locally- and web-hosted applications frequently include mechanisms that developers use to track the ways in which their users interact with the application. Such mechanisms are generally tied to a specific tracking system maintained by a third-party. The third-party system gathers and processes the tracking data and provides it to application developer. Some tracking services provided by different third-party systems may differ from some third-party systems and may be virtually identical to others. As a result, developers must either select a single best fit tracking system, or instrument their applications to send tracking data to multiple tracking systems.

SUMMARY

In general, in one aspect, the invention relates to a system that includes a computer processor, a tracking engine executing on the computer processor, and a translation engine executing on the computer processor. The tracking engine is configured to retrieve a translation engine from a translation engine provider system, detect a user-generated action has occurred, and generate a pre-translated event for the user generated action using the translation engine application programming interfaces (APIs). The translation engine is configured to translate the pre-translation event to obtain a first translated event, prepare the first translated event for transmission to a first tracking system, and send the first translated event to the first tracking system.

In general, in one aspect, the invention relates to a method for tracking interactions between a user and an application. The method includes retrieving a translation engine, detecting a user-generated action occurs, and generating a pre-translated event for the user generated action using a translation engine application programming interface (API) associated with the translation engine. The method further includes translating the pre-translated event to obtain a first translated event, preparing the first translated event for transmission, and sending the first translated event to a first tracking system.

In general, in one aspect, the invention relates to a non-transitory computer readable medium comprising instructions that, when executed by a processor, perform to a method for tracking interactions between a user and an application. The method includes retrieving a translation engine, detecting a user-generated action occurs, and generating a pre-translated event for the user generated action using a translation engine application programming interface (API) associated with the translation engine. The method further includes translating the pre-translated event to obtain a first translated event, preparing the first translated event for transmission, and sending the first translated event to a first tracking system.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for translating user-generated action for tracking by multiple tracking systems. Specifically, embodiments of the invention may be used to generate one or more translated events and sending the translated events to one or more different tracking systems.

Figure 1:
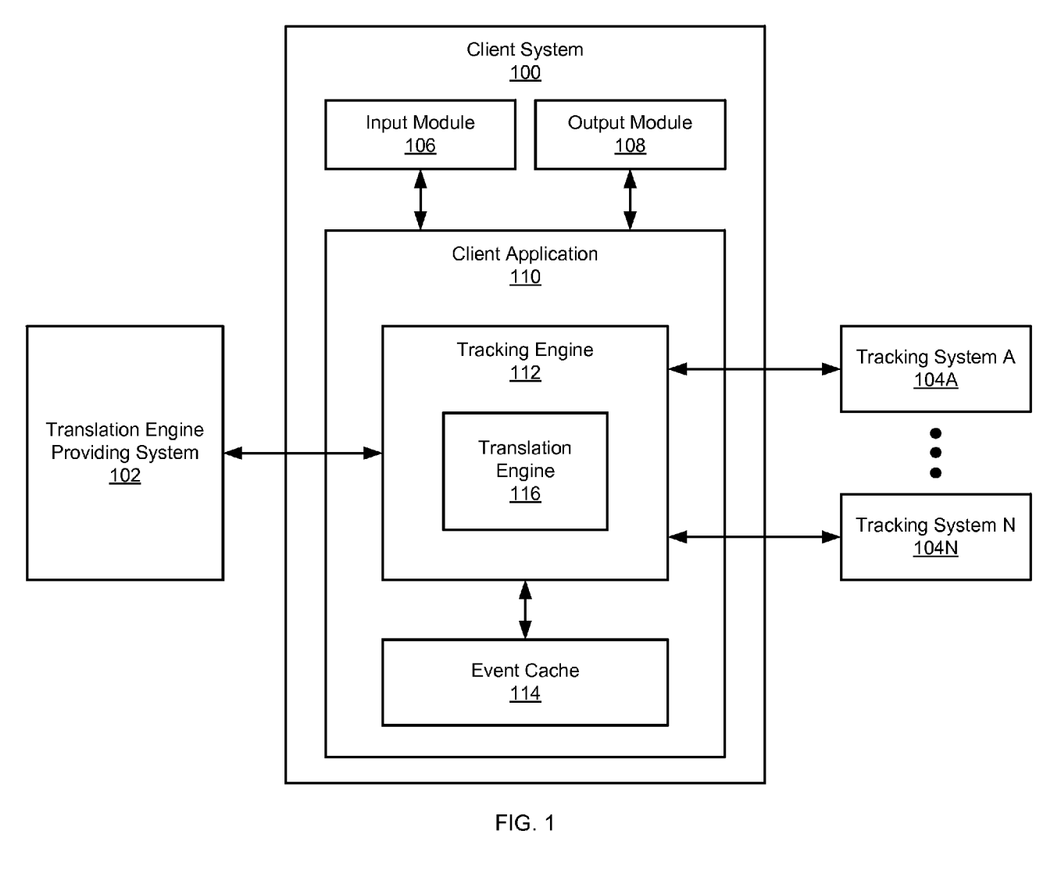
FIG. 1 shows a flow diagram of a system in accordance with one or more embodiments of the invention.

FIG. 1 shows a diagram of a system in accordance with one or more embodiments of the invention. As shown in FIG. 1, the system includes a client system (100), a translation engine providing system (102), and multiple tracking systems (tracking system A (104A), tracking system N (104N)). The client system (100) includes an input module (106), an output module (108), and a client application (110). The client application (110) includes a tracking engine (112) and an event cache (114). The tracking engine (112) includes a translation engine (116).

In one or more embodiments of the invention, the client system (100) is a computer system or group of computer systems configured to execute the client application (110). The client system (100) may be implemented, for example, as a desktop computer system, a laptop computer system, a tablet computer system, a smartphone, etc.

In one or more embodiments of the invention, the client application (110) is a software program executing on the client system (100) and configured to interact with a user of the client system (100). In one embodiment of the invention, the client application (110) interacts with a user of the client system (100) to obtain data from the user, process data provided by the user, and/or provide data to the user. Data used by the client application (110) for interactions with the user may be stored locally, or may be sent to or obtained from a server system (not shown) configured to interact with the client application (110). For example, a client application (110) implemented as a financial management application may obtain financial data from a user (via the input module (106)) and send that financial data to a server system (not shown) for processing. The server system (not shown) may then send processed data back to the financial management application, which in turn displays the processed data to the user (via the output module (108)).

In one or more embodiments of the invention, the client application (110) is a platform (e.g., a web browser) upon which other programs may be executed (e.g., a webpage). In one embodiment of the invention, a client application (110) includes functionality to retrieve a program (e.g., a webpage) based on a resource address provided by the user. In one embodiment of the invention, the retrieved program (not shown) includes the tracking engine (112). In one embodiment of the invention, the retrieved program (not shown) may further be configured to generate the event cache (114). For example, a user may provide a web address to a client application (110) implemented as a web browser, and the client application (110) may retrieve the webpage stored at the web address. The client application (110) may then execute the webpage, which is displayed to the user as an interactive website.

In one or more embodiments of the invention, the client application (110) interacts with the user via the input module (106) and the output module (108). The input module (106) may include any combination of hardware and software by which input is received by the client application (110). Examples of input modules (106) include, but are not limited to, a keyboard, a mouse, a touch interface, voice recognition software, a network communication connection, a system clock, etc. The output module (108) may include any combination of hardware and software by which output is sent by the client application (110). Examples of output modules (108) include, but are not limited to, a display, a network communication connection, an audio output device, etc.

In one or more embodiments of the invention, the tracking engine (112) is a portion of the client application (110) configured to monitor interactions (i.e., user-generated actions) between a user and the client application (110). In one embodiment of the invention, the tracking engine (112) is implemented as part of the client application (110). Alternatively, tracking engine (112) is part of a program retrieved by the client application (110) (e.g., instrumented in a webpage).

In one or more embodiments of the invention, a user-generated action is input received from a user targeting one or more elements of the client application (110). User-generated actions may include passive user-generated actions and active user-generated actions. In one embodiment of the invention, a passive user-generated action is input received without an affirmative act by the user. Examples of passive user-generated actions include, but are not limited to, the amount of time a user spends on a particular screen and whether a text field was left blank by a user. In one embodiment of the invention, an active user-generated action is input received by an affirmative act by the user (e.g., via the input module (106)). Examples of active user-generated actions include, but are not limited to, portions of a screen that a user clicks on, time of day a user uses the client application (110), and location from which a user accesses the client application (110).

In one or more embodiments of the invention, the tracking engine (112) is implemented as code that listens for particular user-generated actions. Specifically, the tracking engine (112) may be configured to listen for a specific set of the user-generated actions selected by the developer of the client application (110) or a program retrieved by the client application (110). Upon the detection of a user-generated action, the tracking engine (112) generates a pre-translated event corresponding to the detected user-generated action.

In one or more embodiments of the invention, a pre-translated event is a descriptor of a user-generated action using an application programming interface (API) for communication with the translation engine (116). Specifically, the translation engine (116) may be configured to accept information (i.e., a pre-translated event) formatted according to a translation engine API. For example, the user-generated action of clicking a "cancel" button may correspond to a translation engine API command (i.e., a pre-translated event) of "EVENT: CLICK_CANCEL".

In one or more embodiments of the invention, a pre-translated event includes information about the circumstances under which the user-generated action occurred. The information about the circumstances under which the user-generated action occurred includes a timestamp indicating the time at which the user generated action occurred. In one embodiment of the invention, the translation engine (116) includes the ability to accept a translation engine API command that includes the timestamp. For example, the user-generated action of clicking a "cancel" button at time "2109" may correspond to a translation engine API command (i.e., a pre-translated event) of "EVENT:CLICK_CANCEL/TIME: 2109". Such information about the circumstances under which the user-generated action occurred may include other information such as, for example, an identifier of the client system (100), an identifier of the client application (110), client system (100) hardware information, client system (100) software information, a session identifier, etc.

In one or more embodiments of the invention, the tracking engine (112) includes functionality to retrieve a translation engine (116). Specifically, the tracking engine (112) may, upon initial execution of the client application (110), request software code from a translation engine providing system (102). The tracking engine (112) may then use the software code retrieved from the translation engine providing system (102) to instantiate a translation engine (116).

In one or more embodiments of the invention, the translation engine providing system (102) is a computer system or group of computer systems configured to store the translation engine (116) and provide the translation engine (116) in response to a request by a client system (100). In one embodiment of the invention, the translation engine providing system (102) dynamically generates software code for the translation engine (116) based on parameters passed in the request by the client system (100). Such dynamically generated software code may be tailored to include translation capabilities to translate a pre-translated event into a translated event recognizable by a specific tracking system (tracking system A (104A), tracking system B (104B)).

In one or more embodiments of the invention, the translation engine providing system (102) generates a translation engine (116) using preconfigured parameters. Specifically, a developer may have the capability to configure the translation engine providing system (102) to generate a translation engine with specific capabilities (e.g., translate pre-translated events into translated events targeting a specified target tracking system or set of target tracking systems). Such a translation engine may then be retrieved by including a developer identifier in the request for a translation engine (116). For example, a developer of a client application (110) may log into an account on the translation engine providing system (102) and configure a translation engine to translate all pre-translated events into translated events acceptable by Alpha Analytics (a tracking system (tracking system A (104A), tracking system N (104N))). The developer may then instrument the code of the client application (101) to include that developers account identifier in the request for the translation engine (116). Upon receiving the request for the translation engine (116) and the developer account identifier, the translation engine providing system (102) provides the preconfigured translation engine to the requesting client system (100).

In one or more embodiments of the invention, the translation engine (116) is a process or group processes configured to translate a pre-translated event into a translated event. Specifically, the translation engine (116) includes functionality to receive pre-translated events generated using the translation engine (116) API, and in response, provide one or more corresponding translated events configured for submission to one or more tracking systems (tracking system A (104A), tracking system N (104N)). Translated events configured for submission to one or more tracking systems (tracking system A (104A), tracking system N (104N)) may include generating a tracking system API command corresponding to the pre-translated event. The translated events may be transmitted to the tracking systems (tracking system A (104A), tracking system N (104N)) directly by the tracking engine (116), or may be provided to the tracking engine (112) for eventual submission to the tracking systems (tracking system A (104A), tracking system N (104N)).

In one or more embodiments of the invention, the translation engine (116) translates pre-translated events into translated events using data stored locally within the translation engine (116). Alternatively, the translation engine (116) translates pre-translated events into translated events using a translation server (not shown). In one embodiment of the invention, the translation engine (116) submits a pre-translated event to the translation server (not shown) and, in response, receives a translated event. Such a request may include, for example, the pre-translated event and a tracking system API to which the translated event is to correspond.

In one or more embodiments of the invention, the translation engine (116) includes one or more translation keys (not shown). In one embodiment of the invention, a translation key (not shown) is an algorithm that accepts all or part of a pre-translated event, and returns all or part of a translated event. A translation key may parse the pre-translated event and extract, rearrange, or remove portions of the pre-translated event to generate the translated event. In one embodiment of the invention, each translation key is associated with a different tracking system API. In one embodiment of the invention, a pre-translated event is submitted to the translation engine (116) with a target tracking system. The translation engine (116) may select a translation key corresponding to the target tracking system, and apply that translation key to the pre-translated event to generate the translated event.

In one or more embodiments of the invention, translated events generated by the tracking engine (112) may be stored in the event cache (114). In one embodiment of the invention, the event cache (114) is a mechanism by which translated events are stored in memory on the client system (100). In one embodiment of the invention, translated events are stored in the event cache (114) if there is currently no or restricted access to the target tracking system (tracking system A (104A), tracking system N (104N)). For example, if communication with a target tracking system (tracking system A (104A), tracking system N (104N)) is conducted over a network, translated events may be stored in the event cache (114) if the client application (110) detects that the client system (100) is not currently connected to the network.

In one or more embodiments of the invention, pre-translated events may be stored in the event cache (114). Specifically pre-translated events may be generated by the tracking engine (112) and stored in the event cache (114) until such time that they are retrieved for translation by the translation engine (116).

In one or more embodiments of the invention, a tracking system (tracking system A (104A), tracking system N (104N)) is a computer system or group of computer systems configured to receive translated events sent by a client system (100). Specifically, each tracking system (tracking system A (104A), tracking system N (104N)) may be configured to obtain translated events from a number of client systems (e.g., client system (100)), analyze data from the translated events, and provide that data analysis to a developer of the client application or another interested party. Such data analysis may include metrics regarding the ways in which users of the client application interacts with the client application.

In one or more embodiments of the invention, each tracking system (tracking system A (104A), tracking system N (104N)) has a tracking system API unique to that tracking system (tracking system A (104A), tracking system N (104N)). Specifically, a translated event generated using the tracking system API for tracking system A (104A) will not be acceptable by tracking system N (104N). In addition, a pre-translated event generated using the translation engine API maybe unacceptable by any tracking system.

In one or more embodiments of the invention, multiple translated events may be generated from a single pre-translated event. Specifically, the translation engine (116) may be configured to receive a pre-translated event, and in response, generate a first translated event using the tracking system API for tracking system A (104A) and generate a second translated event using the tracking system API for tracking system N (104N). Each translated event may then be sent to the corresponding tracking system.

Figure 2:
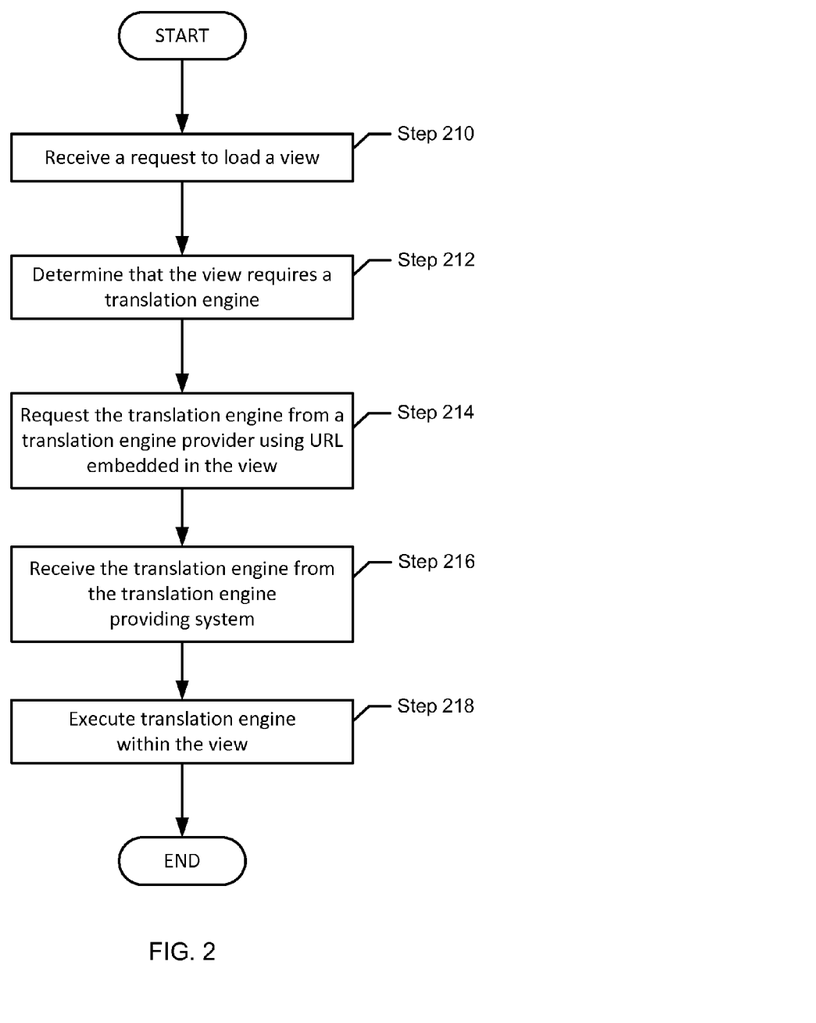
FIGS. 2-3 show a flow chart in accordance with one or more embodiments of the invention.

FIG. 2 shows a flowchart for retrieving a translation engine in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 210, the client application receives a request to load a view. In one embodiment of the invention, the view is part of the client application and used to interact with a user of the client application. In one embodiment of the invention, the view is part of a website or web application and the request includes the network location of the website or web application.

In Step 212, the client application determines that the view requires a translation engine. In one embodiment of the invention, the determination is made when a website or web application retrieved by the client application includes code referencing the translation engine.

In Step 214, the client application requests the translation engine from a translation engine providing system using a uniform resource locator (URL) embedded in the view. In one embodiment of the invention, the request for the translation engine includes parameters indicating specific tracking systems to which the client application intends to send translated events. Specifically, a client application may request a translation engine configured to translate pre-translated events into translated events acceptable by a specified tracking system. In one embodiment of the invention, the translation engine software code is generated by the translation engine providing system based on the specified tracking systems (i.e., capable of translating pre-translated events into translated events acceptable by the specified tracking system). In one embodiment of the invention, the request may also include a developer account identifier to associate the request with a target developer.

In Step 216 the client application receives the translation engine from the translation engine providing system. In Step 218, the client application executes the translation engine within the view.

Figure 3:
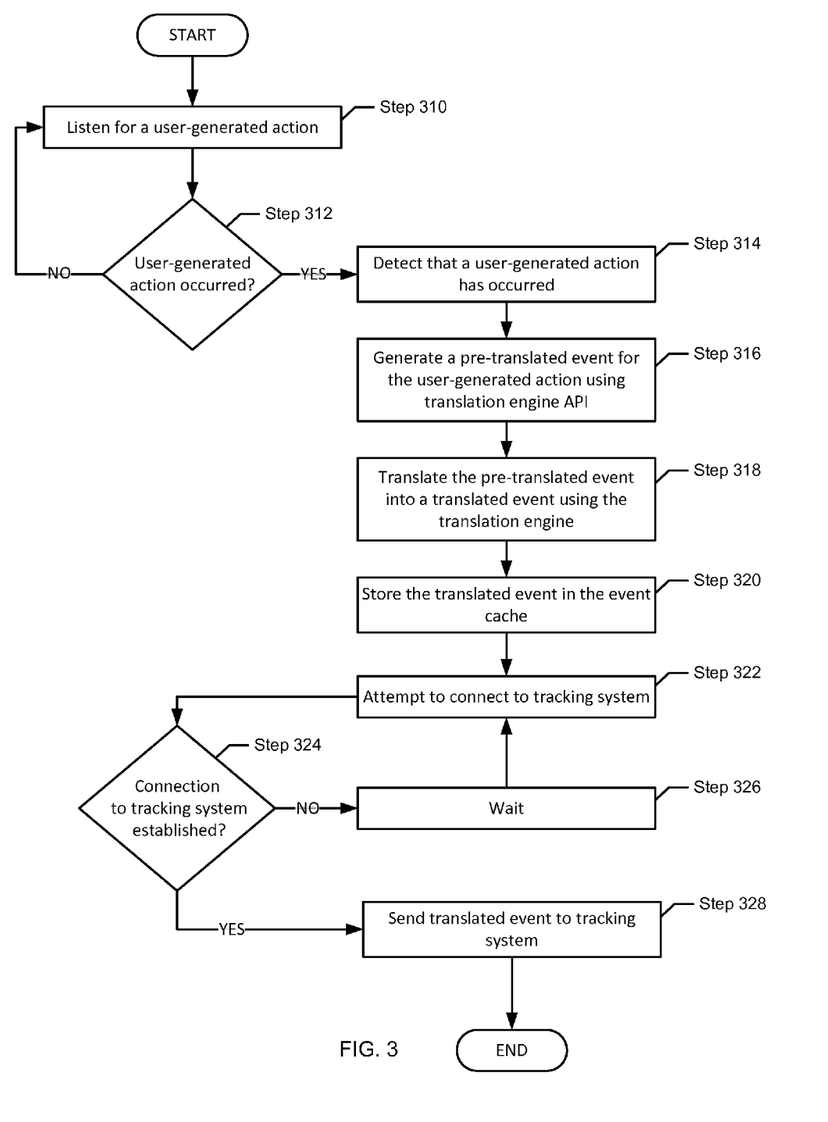

FIG. 3 shows a flowchart for sending translated events to a tracking system accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the client application listens for a user-generated action. In Step 312, the client application determines whether a user-generated action has occurred. If in Step 312, no user-generated action is detected, then the flow returns to Step 310. If in Step 312, a user-generated action has occurred, then in Step 314, the client application detects that the user-generated action has occurred.

In Step 316, the client application generates a pre-translated event for the user-generated action using the translation engine API. In one embodiment of the invention, the code of the client application is instrumented such that a particular user-generated action triggers the submission of a corresponding pre-translated event to the translation engine.

In Step 318, the pre-translated event is translated into a translated event using the translation engine. In one embodiment of the invention, the translation engine includes functionality to translate the pre-translated event into a translated event using a tracking system API for a previously-specified tracking system. In one embodiment of the invention, the tracking engine includes functionality to translate the pre-translated event into more than one translated event, each using a different tracking system API. In one embodiment of the invention, data within the pre-translated event specifies the tracking system or tracking systems to which the client application will send the translated events. In one embodiment of the invention, the translation engine includes functionality to obtain an address corresponding to a location of the target tracking system.

In Step 320, the client application stores the translated event in the event cache. In one embodiment of the invention, the event cache is implemented as a data structure configured to store software objects representing translated events. In one embodiment of the invention, the event cache data structure includes the ability to store a destination address for each stored translated event. In Step 322, the client application attempts to connect to the tracking system. In one embodiment of the invention, the client application includes functionality to attempt to connect with multiple tracking systems. In one embodiment of the invention, user-generated events occur while the client system is not connected to the tracking servers.

In Step 324, the client application determines whether a connection to the tracking system has been established. If in Step 324, the client application determines that a connection to the tracking system has not been established, then in Step 326 the client application waits, and returns to Step 322. If in Step 324, the client application determines that a connection to the tracking system has been established, then in Step 328 the client application sends the translated event to the tracking system. In one embodiment of the invention, all translated events stored in the event cache are sent to the respective tracking system once a connection to each tracking system has been established.

In one or more embodiments of the invention, translated events will only be accepted by a tracking system if the source of the translated event is trusted. In one embodiment of the invention, a tracking system may require authentication before a client system may submit a translated event. Such authentication may be embedded in the translated event and/or may be performed between the client system and the tracking system prior to the transmission of the translated event. Authentication may include, but is not limited to, public/private key authentication and username/password authentication.

In one embodiment of the invention, translated events are sent to the tracking systems with a timestamp indicating the time at which the corresponding user-generated action occurred (as opposed to the time at which the tracking system receives the translated event). Therefore, data regarding the time at which the user-generated action occurred is maintained despite any amount of time that the translated event spent stored in the event cache.

Figure 4A:
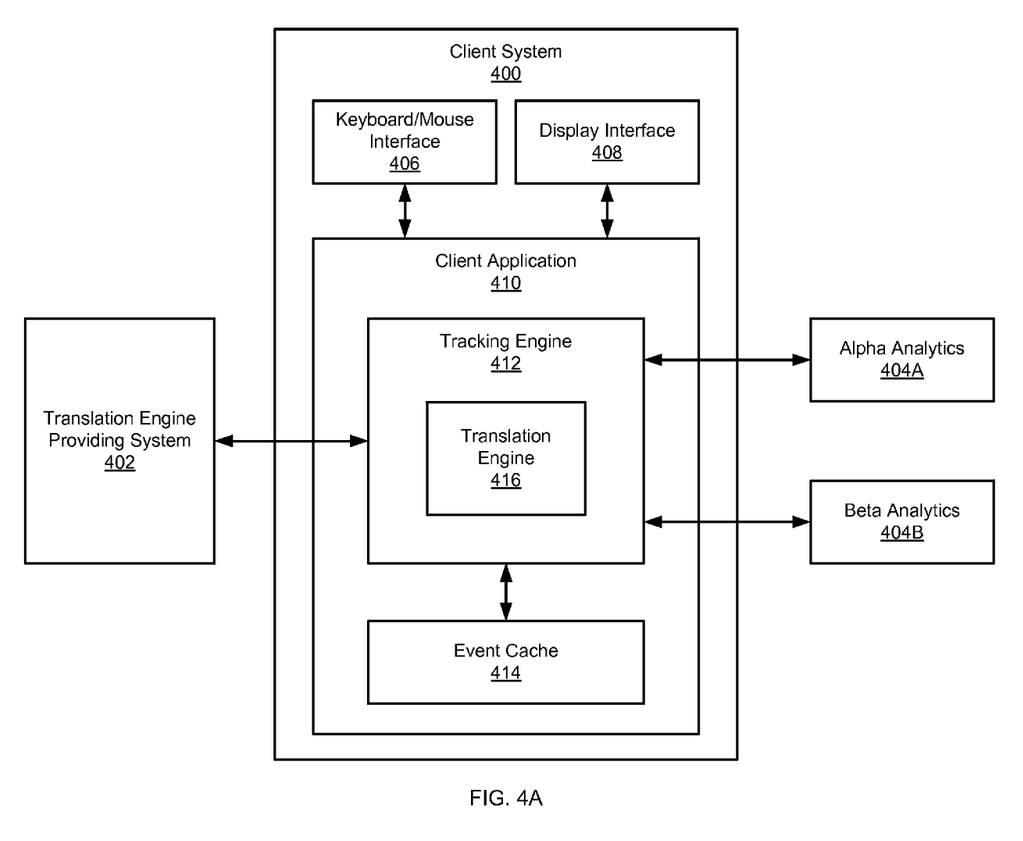
FIGS. 4A-4D show an example in accordance with one or more embodiments of the invention.

FIG. 4A shows an example system in accordance with one or more embodiments of the invention. As shown in FIG. 4A, the system includes a client system implemented as a laptop computer (400), a translation engine providing system (402), and two tracking systems (Alpha Analytics (404A), Beta Analytics (404B)). The laptop computer (400) includes an input module implemented as a keyboard/mouse interface (406), an output module implemented as a display interface (408), and a client application (410). The client application (410) includes a tracking engine (412) and an event cache (414). The tracking engine (412) includes a translation engine (416).

Figure 4B:
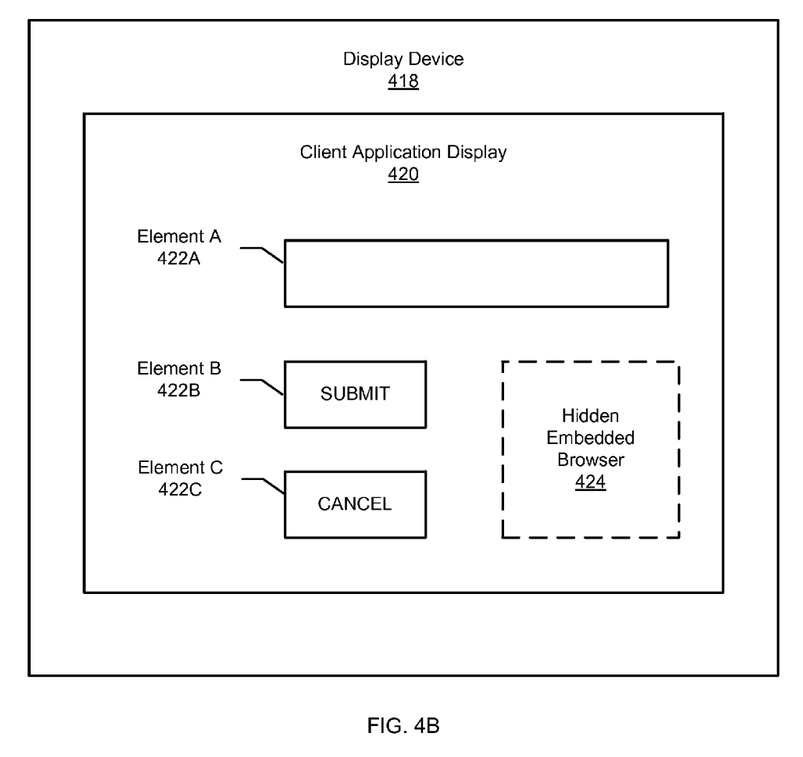

FIG. 4B shows a user interface for a screen of the client application (410) in accordance with one or more embodiments of the invention. The screen is presented on display device (418) communicatively coupled to the display interface (408). Presented on the display device (418) is the client application display (420). The client application display (420) includes element A (422A) (a text input field), element B (422B) (a submit button), and element C (422C) (a cancel button). The client application display (420) also includes a hidden embedded browser (424).

Figure 4C:
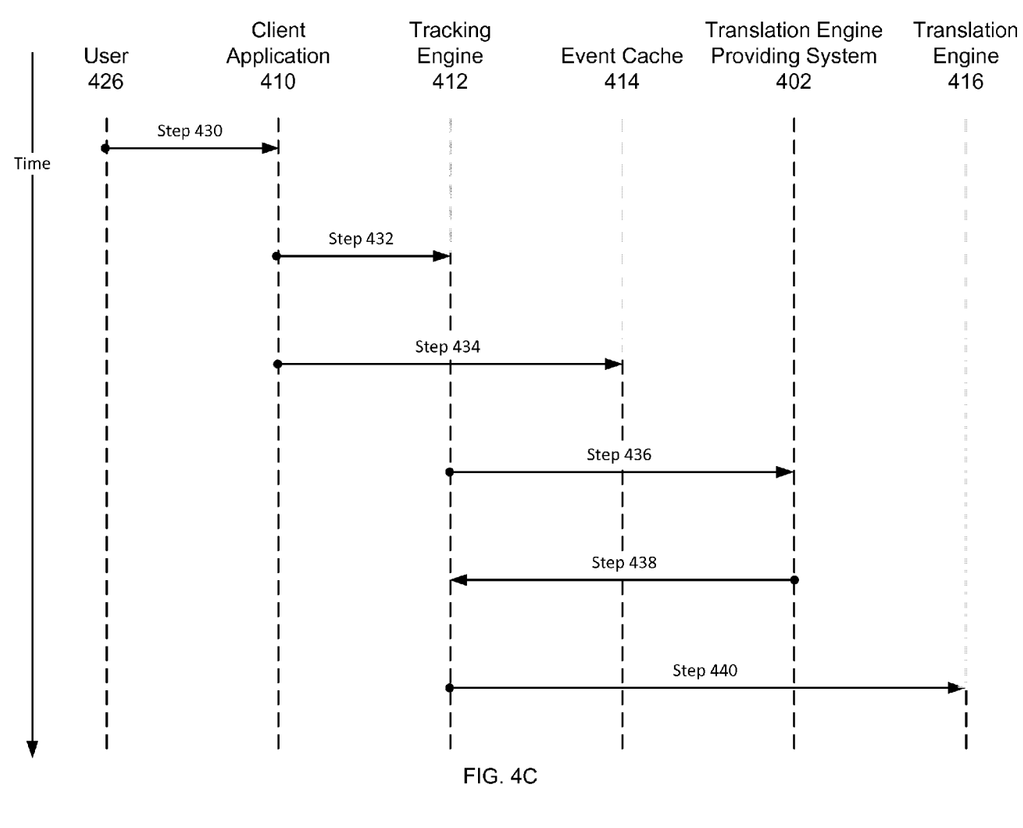

FIG. 4C shows an exemplary timeline for retrieving a translation engine in accordance with one or more embodiments of the invention.

In Step 430, the user (426) instructs the client application (410) to load client application display (420). For the purposes of this example, assume that client application (410) is a financial management application. Further, assume that the client application display (420) is a view within the client application (410) used to obtain a yearly income from the user.

In Step 432, the client application begins to load the view software code corresponding to the view of the client application (410), including portions of the view software code that comprise the tracking engine (412). In Step 434, the client application (410), as instructed by the view software code, creates a data structure for use by the tracking engine (412) as an event cache (414).

In Step 436, the client application (410) loads the portion of the view software code instructing the tracking engine (412) to request a translation engine (416) from the translation engine providing system (402). For the purposes of the example, assume that the request indicates that the tracking engine intends to submit translated events to two tracking systems (Alpha Analytics (404A) and Beta Analytics (404B)).

In Step 438, the translation engine providing system (402) provides software code corresponding to the translation engine (416). In Step 440, the tracking engine (416) uses the software code obtained from the translation engine providing system (402) to instantiate the translation engine (416) as a hidden embedded browser (424) within the client application display (420). For the purposes of the example, assume that Alpha Analytics (404A) is a free event analysis tool that provides limited analysis. Assume further that Beta analytics (404B) is a robust event analysis tool that charges developers based on the number of submitted translated events.

Figure 4D:
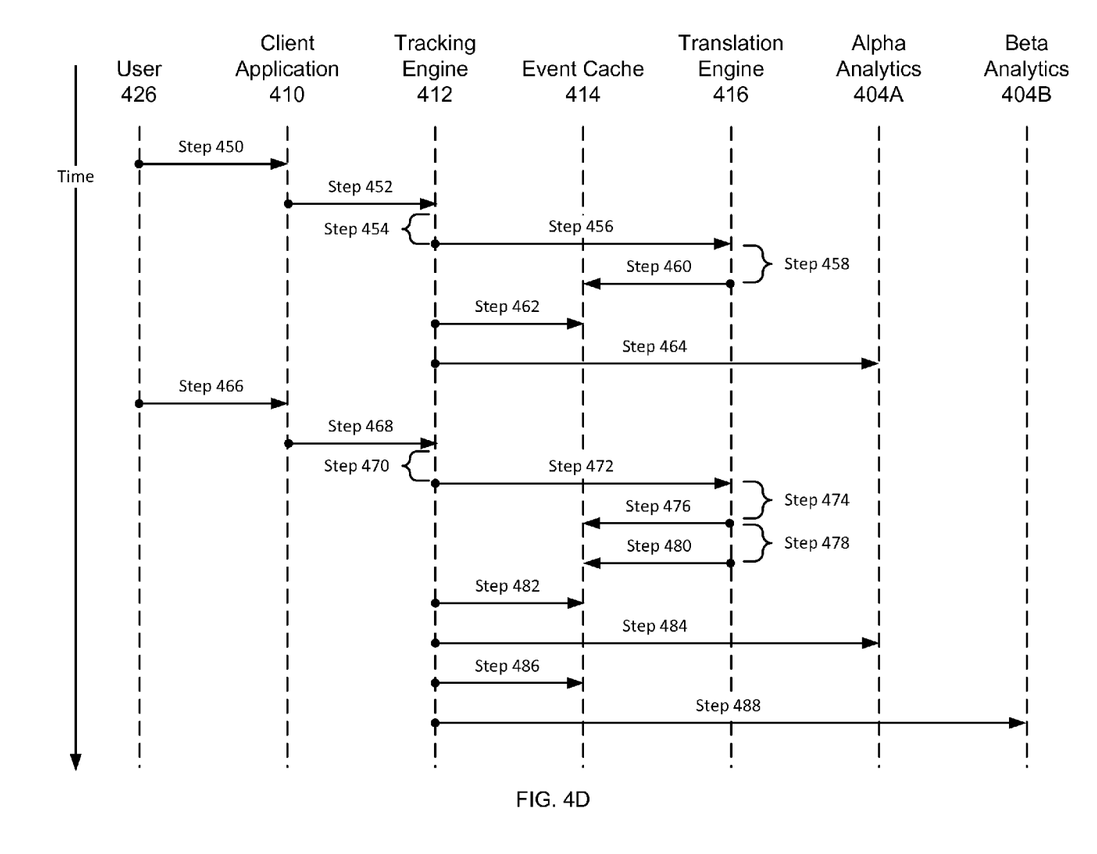

FIG. 4D shows an exemplary timeline in accordance with one or more embodiments of the invention.

In Step 450, the user (426) clicks the submit button (element B (422B)) without inputting any text into the text field (element A (422A)). In Step 452, the client application (410) provides this user-generated action to the tracking engine (412). In Step 454, the tracking engine (412) generates a pre-translated event for the user-generated action using the translation engine (416) API. For the purposes of this example, assume that the pre-translated event includes a session ID, an event name, a target tracking system identifier, and a timestamp, and is generated as "SessionID:001_Event: SUMBIT-PRESS-EMPTY-FIELD_Target:ALPHA-ANALYTICS_Timestamp:083224"

In Step 456, the tracking engine (412) submits the pre-translated event to the translation engine (416). In Step 458, the translation engine (416) generates a translated event using the Alpha Analytics (404A) API based on the pre-translated event "SessionID:001_Event:SUMBIT-PRESS-EMPTY-FIELD_Target:ALPHA-ANALYTICS$_{13}$ Timestamp: 083224". In Step 460, the translation engine (416) stores the translated event in the event cache (414) along with an address targeting Alpha Analytics (404A).

In Step 462, the tracking engine (412) determines that a communication connection with Alpha Analytics (404A) has been established, and retrieves the translated event and target address from the event cache (414). In Step 464, the tracking engine (412) submits the translated event to Alpha Analytics (404A) using the target address.

In Step 466, the user (426) clicks the cancel button (element C (422C)) after entering "$45,000" into the text field (element A (422A)). In Step 468, the client application (410) provides this user-generated action to the tracking engine (412). In Step 470, the tracking engine (412) generates a pre-translated event for the user-generated action using the translation engine (416) API. For the purposes of this example, assume that the pre-translated event is generated as "SessionID:001_Event:CANCEL-PRESS-NONEMPTY-FIELD_Target:ALPHA-ANALYTICS;BETA-ANALYTICS_Timestamp:083356"

In Step 472, the tracking engine (412) submits the pre-translated event to the translation engine (416). In Step 474, the translation engine (416) generates a first translated event using the Alpha Analytics (404A) API based on the pre-translated event "SessionID:001_Event:CANCEL-PRESS-NONEMPTY-FIELD_Target:ALPHA-ANALYTICS; BETA-ANALYTICS_Timestamp:083356". In Step 476, the translation engine (416) stores the first translated event in the event cache (414) along with an address targeting Alpha Analytics (404A). In Step 478, the translation engine (416) generates a second translated event using the Beta Analytics (404B) API based on the pre-translated event "SessionID: 001_Event:CANCEL-PRESS-NONEMPTY-FIELD_Target:ALPHA-ANALYTICS;BETA-ANALYTICS_Timestamp:083356". In Step 480, the translation engine (416) stores the second translated event in the event cache (414) along with an address targeting Beta Analytics (404B).

In Step 482, the tracking engine (412) determines that a communication connection with Alpha Analytics (404A) has been established, and retrieves the first translated event and Alpha Analytics (404A) target address from the event cache (414). In Step 484, the tracking engine (412) submits the first translated event to Alpha Analytics (404A) using the Alpha Analytics (404A) target address.

In Step 486, the tracking engine (412) determines that a communication connection with Beta Analytics (404B) has been established, and retrieves the second translated event and Beta Analytics (404B) target address from the event cache (414). In Step 488, the tracking engine (412) submits the second translated event to Beta Analytics (404B) using the Beta Analytics (404B) target address.

Figure 5:
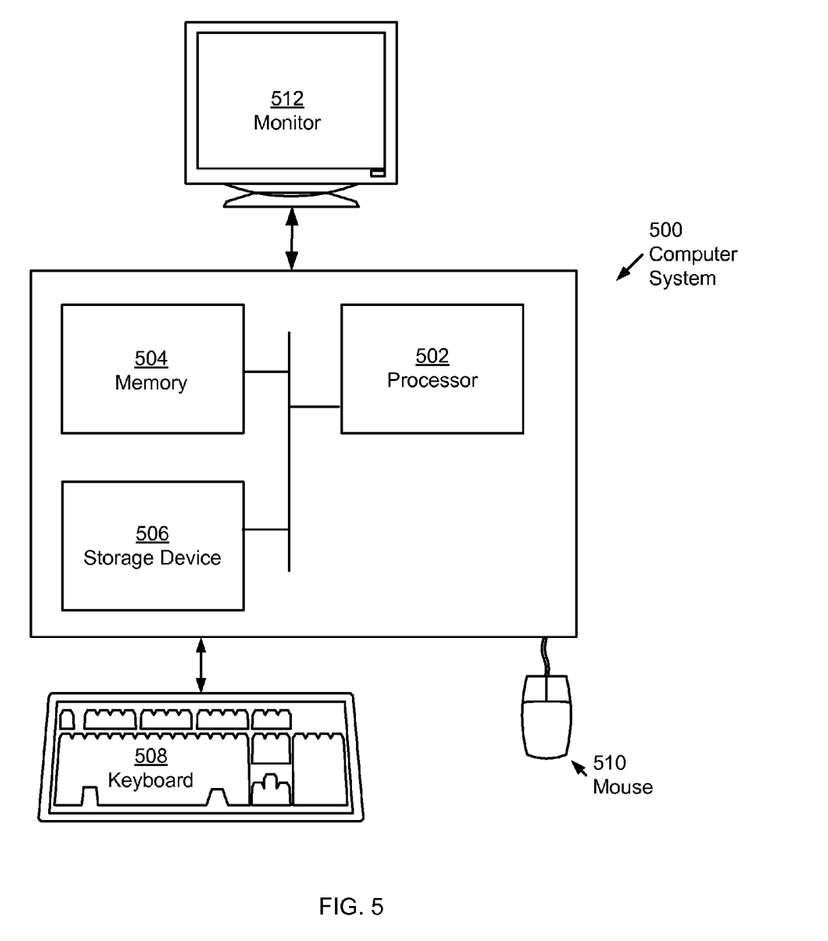
FIG. 5 shows a computer system in accordance with one or more embodiments of the invention.

Embodiments of the invention may be implemented on virtually any type of computer regardless of platform being used. For example, as shown in FIG. 5, a computer system (500) includes one or more processor(s) (502) such as a central processing unit (CPU) or other hardware processor(s), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
    a computer processor;
    a tracking engine executing on the computer processor and configured to:
        retrieve a translation engine from a translation engine provider system,
        detect a passive user-generated action has occurred and an active user-generated action has occurred,
        generate a first pre-translated event for the passive user generated action using a translation engine application programming interfaces (APIs), and
        generate a second pre-translated event for the active user-generated action using the translation engine APIs; and a translation engine executing on the computer processor and configured to:
translate the first pre-translated event and the second pre-translated event to obtain a first translated events, wherein the first translated events are in a first format associated with a first tracking system,
translate the first pre-translated event and the second pre-translated event to obtain a second translated events, wherein the second translated events are in a second format associated with a second tracking system,
prepare the first translated events for transmission to the first tracking system,
prepare the second translated events for transmission to the second tracking system,
send the first translated events to the first tracking system, and
send the second translated events to the second tracking system.

2. The system of claim 1, further comprising:
an event cache configured to store the first translated events,
wherein preparing the first translated events for transmission to the first tracking system comprises retrieving the first translated events from the event cache.

3. The system of claim 1, further comprising:
a transmission engine providing system comprising software code for the translation engine.

4. The system of claim 1, further comprising:
a client application comprising the tracking engine and the translation engine, wherein the client application is configured to receive a user-generated action from an input module.

5. A method for tracking interactions between a user and an application comprising:
retrieving a translation engine;
detecting a passive user-generated action occurs and an active user-generated action occurs;
generating a first pre-translated event for the passive user generated action using a translation engine application programming interface (API) associated with the translation engine;
generating a second pre-translated event for the active user generated action using the translation engine API associated with the translation engine;
translating the first pre-translated event and the second pre-translated event to obtain a first translated events, wherein the first translated events are in a format associated with a first tracking system;
translating the first pre-translated event and the second pre-translated event to obtain a second translated events, wherein the second translated events are in a format associated with a second tracking system;
preparing the first translated events for transmission;
preparing the second translated events for transmission;
sending the first translated events to the first tracking system; and
sending the second translated events to the second tracking system.

6. The method of claim 5,
wherein preparing the first translated events for transmission to the first tracking system comprises storing the first translated events in an event cache, and
wherein sending the first translated events to the first tracking system comprises retrieving the first translated events from the event cache.

7. The method of claim 6,
wherein preparing the first translated events for transmission further comprises establishing a connection with the first tracking system.

8. The method of claim 5, wherein translating the first pre-translated event and the second pre-translated event to obtain the first translated events comprises:
determining a target tracking system;
retrieving a translation key associated with the target tracking system; and
applying the translation key to the first pre-translated event and the second pre-translated event.

9. A non-transitory computer readable medium comprising instructions that, when executed by a processor, perform a method for tracking interactions between a user and an application, the method comprising:
retrieving a translation engine;
detecting a passive user-generated action occurs and an active user-generated action occurs;
generating a first pre-translated event for the passive user-generated action using a translation engine application programming interface (API) associated with the translation engine;
generating a second pre-translated event for the active user-generated action using the translation engine API associated with the translation engine;
translating the first pre-translated event and the second pre-translated event to obtain a first translated events, wherein the first translated events are in a format associated with a first tracking system;
translating the first pre-translated event and the second pre-translated event to obtain a second translated events, wherein the second translated events are in a format associated with a second tracking system;
preparing the first translated events for transmission;
preparing the second translated events for transmission;
sending the first translated events to the first tracking system; and
sending the second translated events to the second tracking system.

10. The non-transitory computer readable medium of claim 9,
wherein preparing the first translated events for transmission to the first tracking system comprises storing the first translated events in an event cache, and
wherein sending the first translated events to the first tracking system comprises retrieving the first translated events from the event cache.

11. The non-transitory computer readable medium of claim 10,
wherein preparing the first translated events for transmission further comprises establishing a connection with the first tracking system.

* * * * *